(12) United States Patent
Frampton

(10) Patent No.: US 9,515,592 B2
(45) Date of Patent: Dec. 6, 2016

(54) SYSTEM AND METHOD OF DETECTING A WIRING CONFIGURATION FOR A CONTROLLED FIELD ALTERNATOR

(71) Applicant: Kohler Co., Kohler, WI (US)

(72) Inventor: Isaac S. Frampton, Strattanville, PA (US)

(73) Assignee: Kohler Co., Kohler, WI (US)

( * ) Notice: Subject to any disclaimer, the term of this patent is extended or adjusted under 35 U.S.C. 154(b) by 549 days.

(21) Appl. No.: 13/667,270

(22) Filed: Nov. 2, 2012

(65) Prior Publication Data

US 2014/0125309 A1 May 8, 2014

(51) Int. Cl.
*H02P 9/00* (2006.01)
*H02P 21/12* (2016.01)
*H02P 1/32* (2006.01)

(52) U.S. Cl.
CPC ............... *H02P 9/00* (2013.01); *H02P 21/12* (2013.01)

(58) Field of Classification Search
CPC ........... H02P 25/184; H02P 21/12; H02P 9/00; G01R 19/00
USPC ............................................ 318/771; 324/66
See application file for complete search history.

(56) References Cited

U.S. PATENT DOCUMENTS

| | | | | |
|---|---|---|---|---|
| 3,696,294 A * | 10/1972 | Krupka | ......................... | 324/105 |
| 6,066,941 A | 5/2000 | French | | |
| 6,169,383 B1 * | 1/2001 | Johnson | ........................ | 318/771 |
| 6,396,247 B1 * | 5/2002 | Gibbs et al. | .................... | 322/28 |
| 6,700,356 B1 * | 3/2004 | Dorn | ....................... | H02P 9/305 |
| | | | | 322/44 |
| 6,734,653 B2 | 5/2004 | Taniguchi et al. | | |
| 6,894,455 B2 | 5/2005 | Cai et al. | | |
| 7,026,794 B1 | 4/2006 | French et al. | | |
| 7,348,764 B2 * | 3/2008 | Stewart | ..................... | H02P 9/48 |
| | | | | 322/24 |

(Continued)

FOREIGN PATENT DOCUMENTS

| | | |
|---|---|---|
| CN | 1565075 A | 1/2005 |
| CN | 2867665 Y | 2/2007 |

(Continued)

OTHER PUBLICATIONS

"Chinese Application No. 201310533230.X, First Office Action dated Dec. 23, 2015", w/ English Summary, 8 pgs.

(Continued)

*Primary Examiner* — Melissa Koval
*Assistant Examiner* — Courtney McDonnough
(74) *Attorney, Agent, or Firm* — Schwegman Lundberg & Woessner, P.A.

(57) ABSTRACT

Some embodiments relate to a controlled field alternator where the alternator is wired in a low wye configuration (coils wired in series or parallel). The first sensor measures the direct current flowing through the field within the alternator to detect an excitation level of a field within the alternator. As examples, the first sensor may measure field voltage, magnetic field intensity, magnetic flux density, current to the field of a rotating exciter, voltage to the field of a rotating exciter and the duty cycle of a pulse width modulated signal that controls an on-board rectifier for a permanent magnet exciter. Embodiments are also contemplated where the second sensor measures the RMS output voltage of the alternator to determine the output characteristic of the alternator.

18 Claims, 10 Drawing Sheets

(56) References Cited

U.S. PATENT DOCUMENTS

| | | | |
|---|---|---|---|
| 7,660,776 B1 * | 2/2010 | Kious | G06N 5/025 |
| | | | 706/45 |
| 8,027,180 B2 | 9/2011 | Nakagawa | |
| 8,065,050 B2 | 11/2011 | West et al. | |
| 2010/0295304 A1 * | 11/2010 | Rowan et al. | 290/44 |
| 2013/0073126 A1 | 3/2013 | Kumar et al. | |

FOREIGN PATENT DOCUMENTS

| | | |
|---|---|---|
| CN | 201937539 U | 8/2011 |
| EP | 1873902 A2 | 1/2008 |
| WO | WO-9623350 A1 | 8/1996 |

OTHER PUBLICATIONS

European Application Serial No. 13188525.3, European Search Report Oct. 11, 2016, (Oct. 11, 2016), 6 pgs.

* cited by examiner

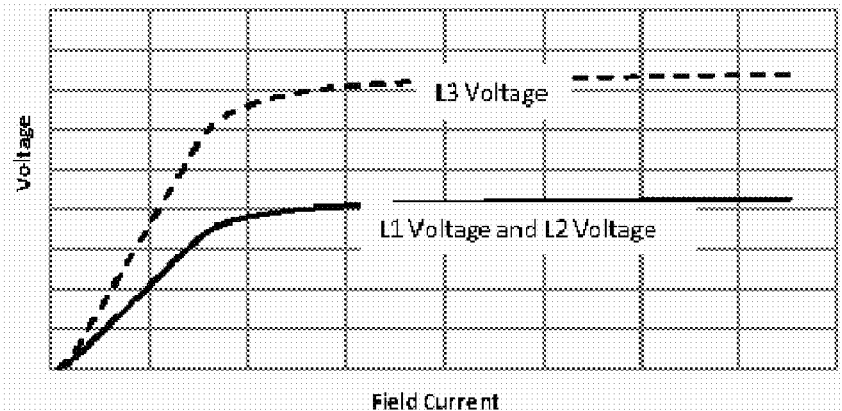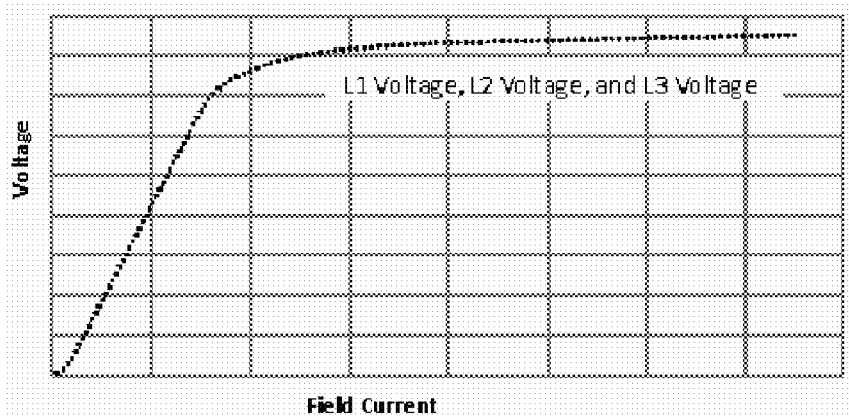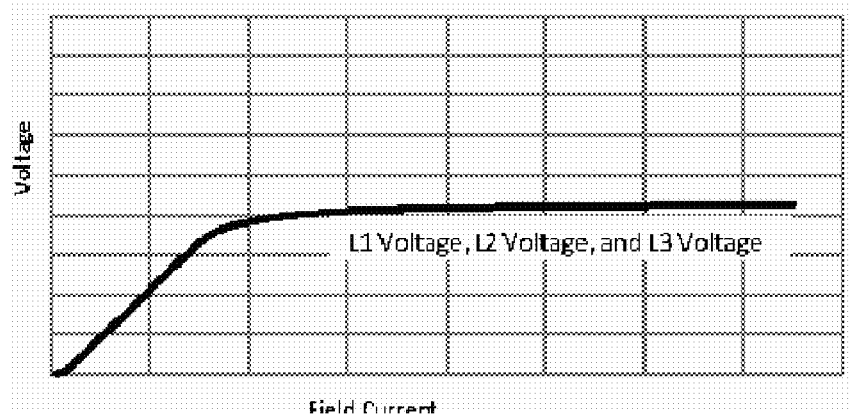
Fig. 5

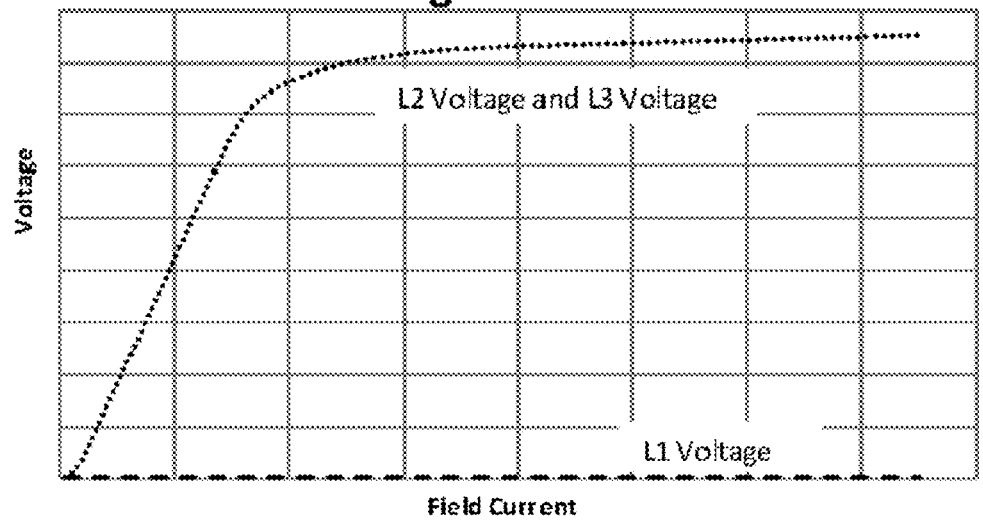
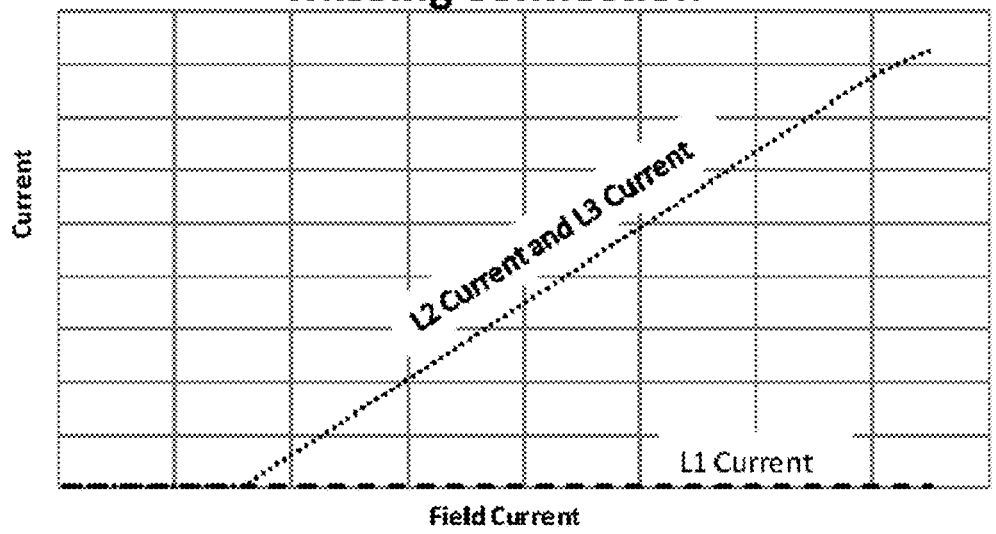
Fig. 8

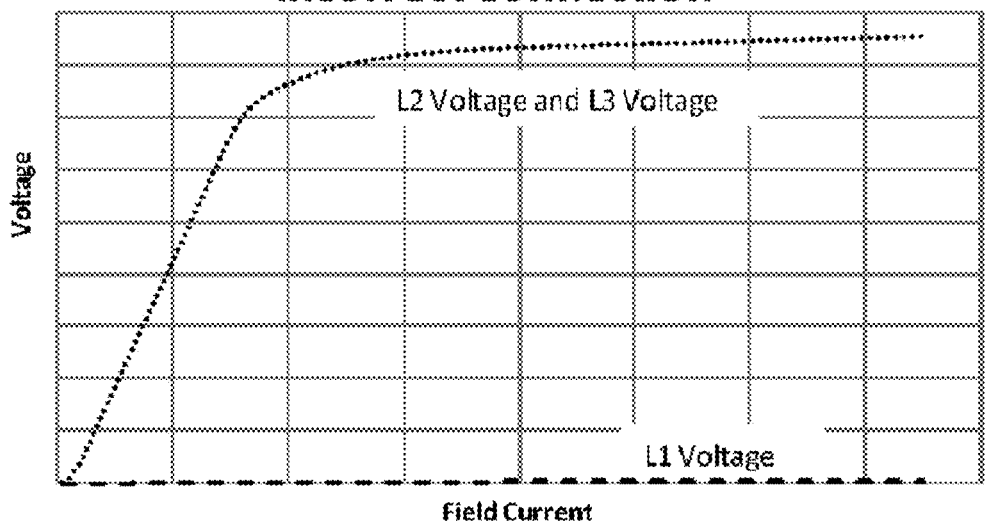
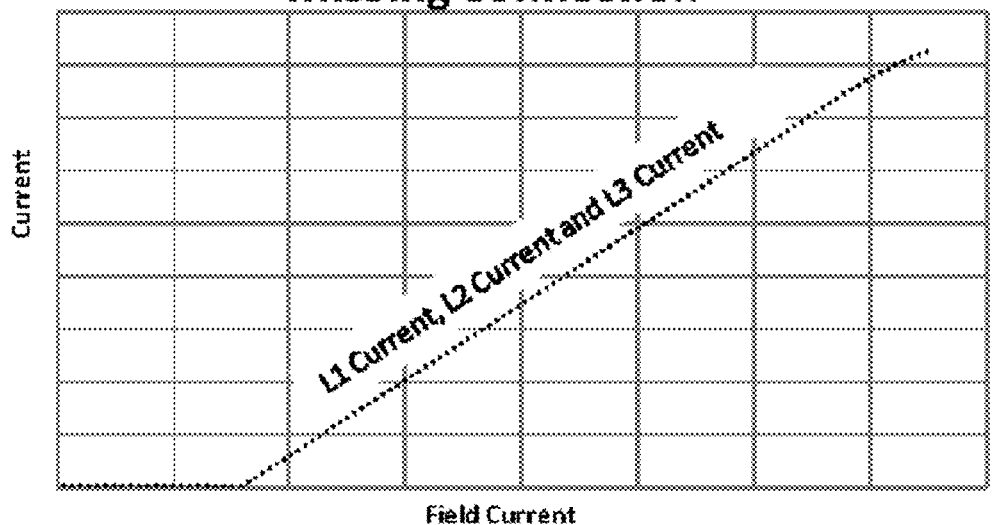
Fig. 9

SYSTEM AND METHOD OF DETECTING A WIRING CONFIGURATION FOR A CONTROLLED FIELD ALTERNATOR

TECHNICAL FIELD

Embodiments pertain to a system and method for detecting a wiring configuration of a controlled field alternator, and more particularly to a system and method for detecting a wiring configuration of a controlled field alternator that produces alternating current and includes a plurality of reconnectable output leads.

BACKGROUND

The alternator of a typical alternating current generator is usually wired in such a manner as to produce a single output voltage level. One of the drawbacks with wiring an alternator in a single configuration is that the generators that include such alternators can only be used in applications that require a particular voltage (i.e., the voltage for which the alternator is designed).

One of the common ways to provide a generator that can be used in more than one application is to utilize an alternator that includes a plurality of reconnectable output leads. These types of generators are able to be wired in more than one configuration such that the systems that include such alternators are able to provide power at different voltages depending on the particular wiring configuration.

One of the drawbacks to utilizing an alternator that includes a plurality of reconnectable output leads is that the alternator can be damaged when the alternator has been incorrectly wired. Another drawback to utilizing an alternator that includes a plurality of reconnectable output leads is that the voltage regulator which controls the field of the alternator in order to maintain an output voltage produced by the alternator must be adjusted for each wiring configuration.

Some systems that utilize an alternator which includes a plurality of reconnectable output leads further include a selector switch. The selector switch permits the selection of a limited number of predetermined wiring configurations for the plurality of reconnectable output leads. The selector switch serves to reduce possible wiring errors. In addition, the selector switch sometimes signals the voltage regulator to change the target output voltage of the alternator.

The drawbacks of including a selector switch in such systems include (i) cost associated with including a selector switch; (ii) space required by incorporating the selector switch and the associated wiring; and (iii) the limited number of wiring configurations that are supported by the selector switch.

BRIEF DESCRIPTION OF THE DRAWINGS

FIG. 5 illustrates an example of the relationship between output voltages and field current when the alternator 101 is connected in a high wye, low wye or delta configuration and when the alternator is not outputting any current.

FIG. 8 illustrates an example sensor measurement when there is a missing connection as shown in FIG. 6.

FIG. 9 illustrates an example sensor measurement when there is a reverse connection as shown in FIG. 7.

DETAILED DESCRIPTION

Figure 1:
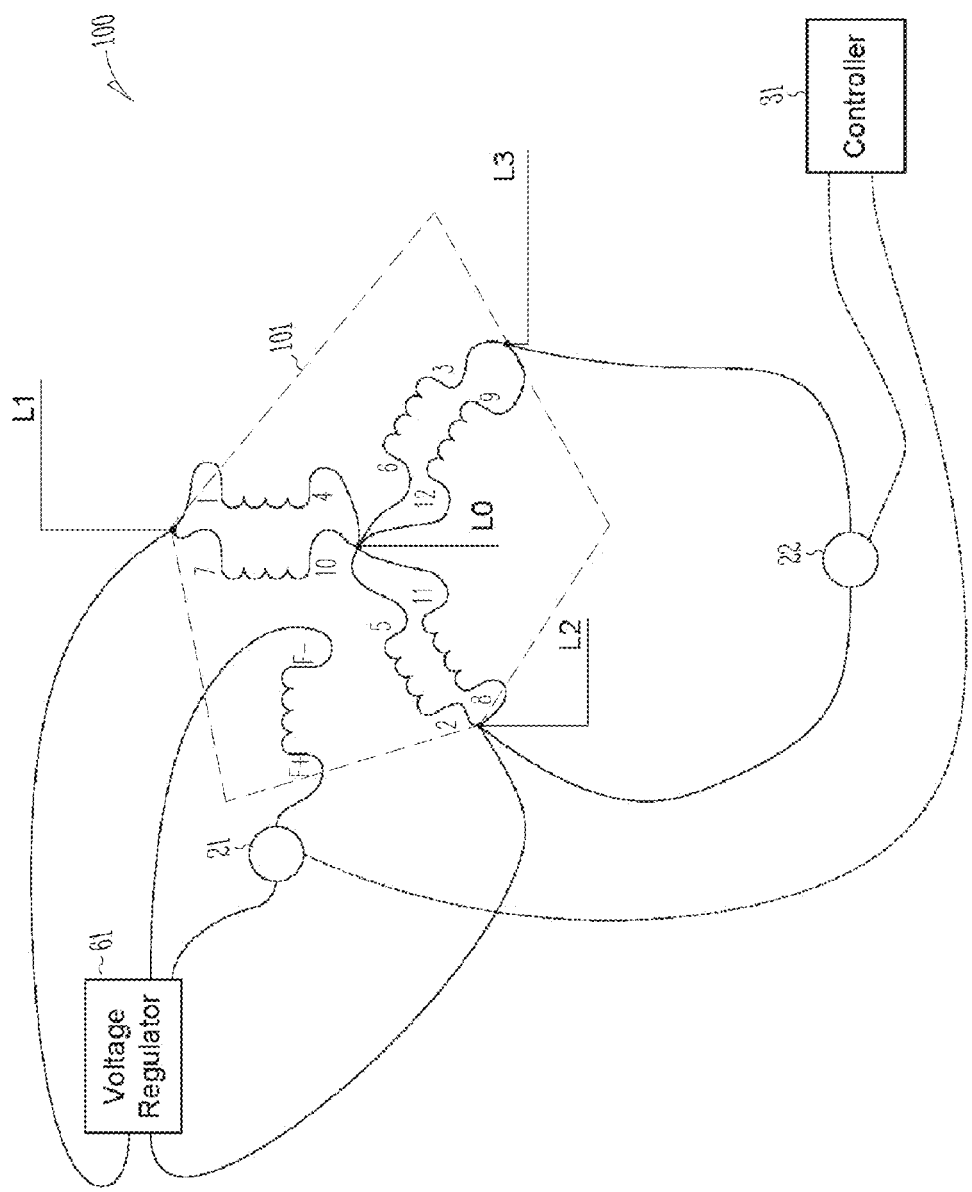
FIG. 1 is a schematic diagram of a controlled field alternator where the alternator is wired in a low wye configuration (coils wired in parallel).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

An example system 100 for detecting a wiring configuration of a controlled field alternator 101 will now be described with reference to FIGS. 1-2. The controlled field alternator 101 produces alternating current and includes a plurality of reconnectable output leads 1-12.

The system 100 includes a first sensor 21 for measuring an excitation level of a field within the alternator 101 and a second sensor 22 for measuring an output characteristic of the alternator 101. The system 100 further includes a controller 31 that uses at least one of the excitation level and output characteristic to determine the connection configuration of the plurality of reconnectable output leads 1-12 of the alternator 101.

Figure 2:
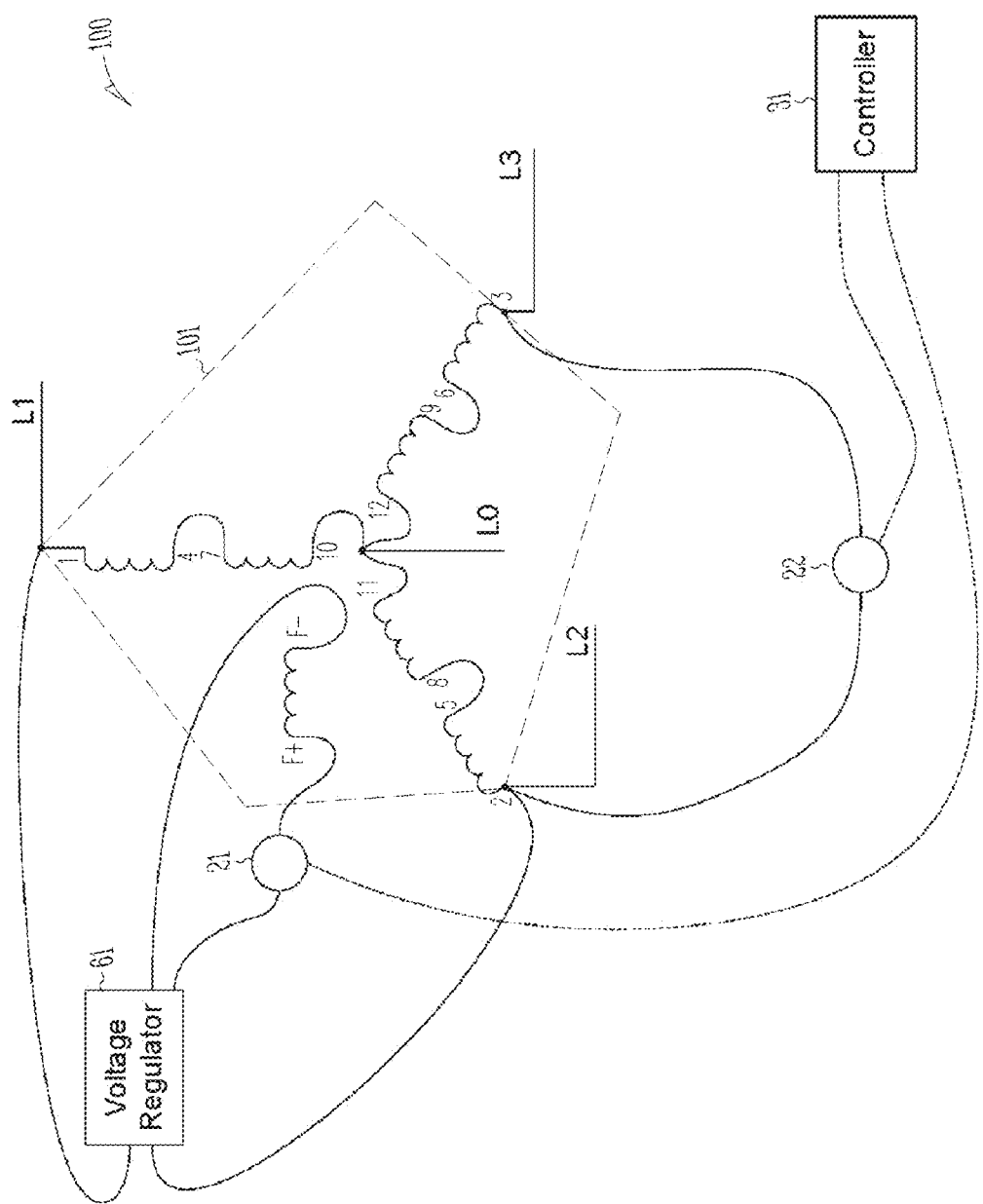
FIG. 2 is a schematic diagram of a controlled field alternator where the alternator is wired in a high wye configuration (coils wired in series).

FIG. 1 is a schematic diagram of a controlled field alternator where the alternator is wired in a low wye configuration (coils wired in parallel). FIG. 2 is a schematic diagram of a controlled field alternator where the alternator is wired in a high wye configuration (coils wired in series).

In some embodiments, the first sensor 21 measures the direct current flowing through the field within the alternator 101 to detect an excitation level of a field within the alternator 101. As examples, the first sensor 21 may measure field voltage, magnetic field intensity, magnetic flux density, current to the field of a rotating exciter, voltage to the field of a rotating exciter and the duty cycle of a pulse width modulated signal that controls an on-board rectifier for a permanent magnet exciter.

Embodiments are also contemplated where the second sensor 22 measures the RMS output voltage of the alternator 101 to determine the output characteristic of the alternator 101. In other embodiments, the second sensor 22 may measure the RMS output current of the alternator 101 to determine the output characteristic of the alternator 101. Additional output characteristics include real power, reactive power, total harmonic distortion and/or harmonic content of the output voltage and/or current (among other characteristics).

The controller 31 may include a plurality of predetermined voltage ranges (e.g., stored within a database) such that the controller 31 compares the output characteristic of the alternator 101 that is measured by the second sensor 22 with the plurality of predetermined voltage ranges to determine the wiring configuration of the alternator 101. In some embodiments, the controller 31 determines the plurality of predetermined voltage ranges using the excitation level that is measured by the first sensor 21.

Figure 3:
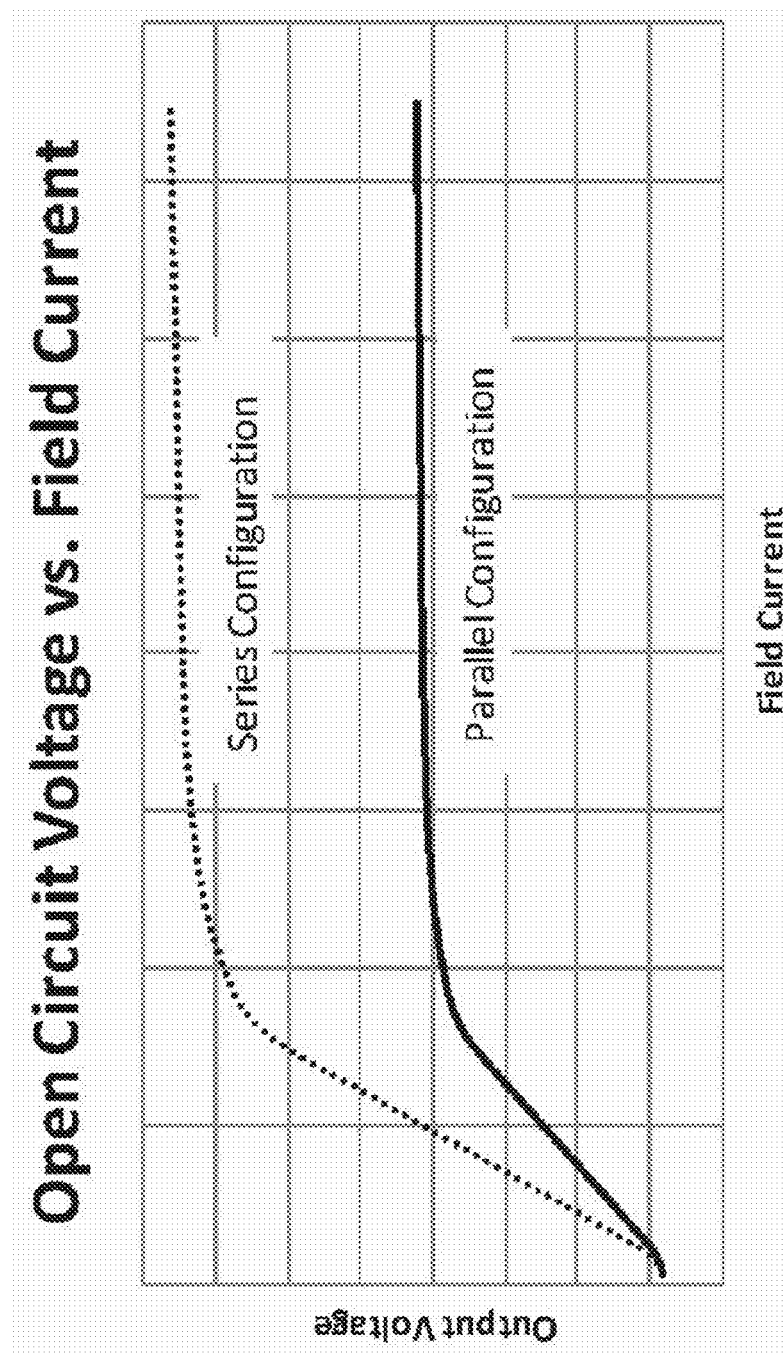
FIG. 3 shows an example relationship between an excitation level and an output characteristic of the alternator when the alternator is wired in a low wye and a high wye configuration.

FIG. 3 shows an example relationship between an excitation level and an output characteristic of the alternator when the alternator is wired in a low wye and a high wye configuration. It should be noted that FIG. 3 illustrates a condition where the alternator 101 is outputting no current.

It should be noted that embodiments are contemplated where the controller 31 uses the excitation level that is obtained from the first sensor 21 and the output characteristic that is obtained from the second sensor 22 to determine whether the plurality of reconnectable output leads 1-12 are in an appropriate wiring configuration. The determination as to whether the controller 31 uses one, or both, of the excitation level that is obtained from the first sensor 21 and the output characteristic that is obtained from the second sensor 22 to determine whether the plurality of reconnectable output leads 1-12 are in an appropriate wiring configuration will depend in part on the overall design and type of alternator 101 that is included in the system 100 (among other factors).

Figure 4:
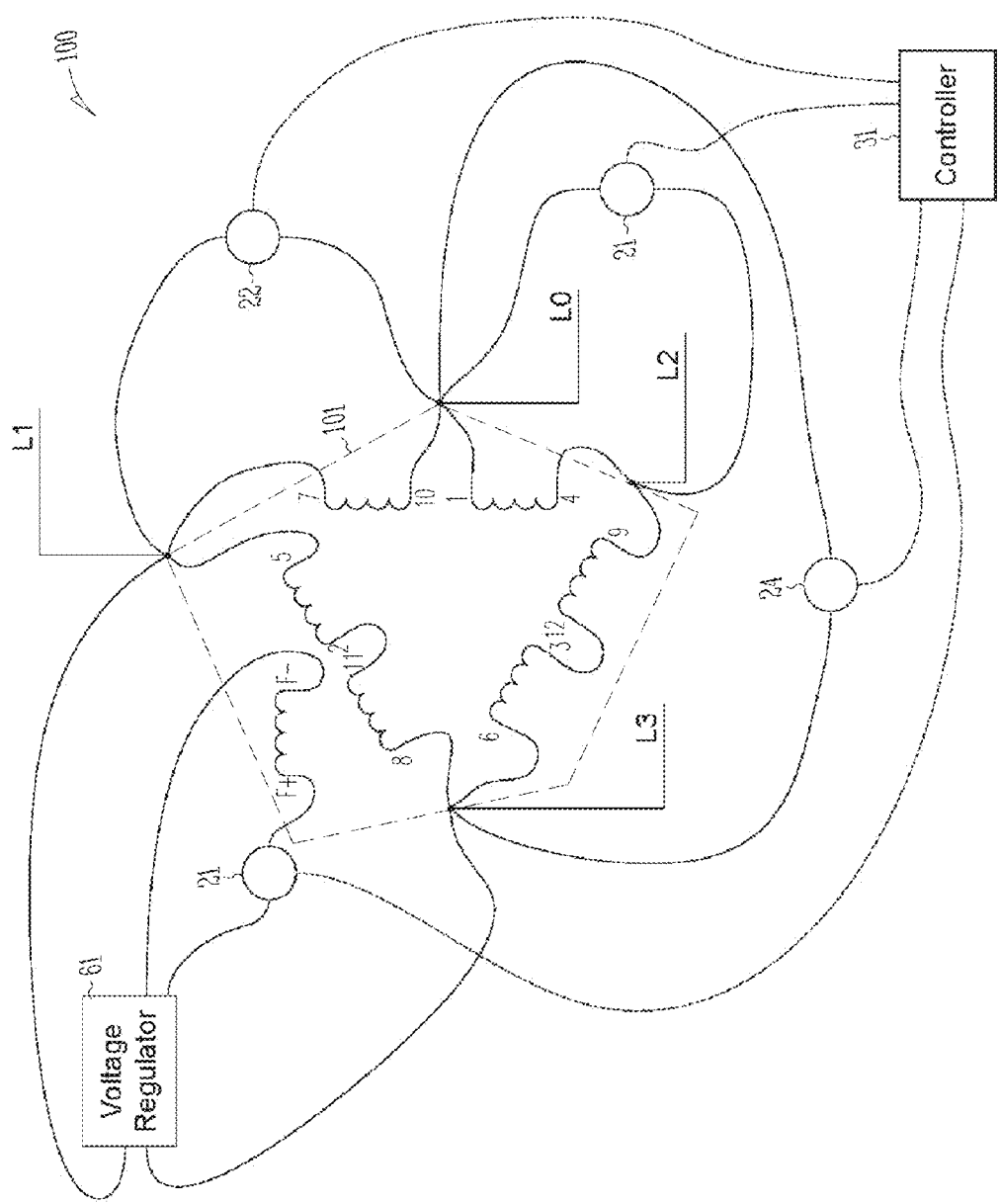
FIG. 4 is a schematic diagram of a controlled field alternator where the alternator is wired in a delta configuration with three output characteristic sensors.

In the example embodiment shown in FIG. 4, the second sensor 22 measures the RMS output voltage of a first junction 5, 7 of the plurality of reconnectable output leads 1-12 of the alternator 101. The system 100 further includes (i) a third sensor 23 that measures the RMS output voltage of a second junction 4, 9 of the plurality of reconnectable output leads 1-12 of the alternator 101; and (ii) a fourth sensor 24 that measures the RMS output voltage of a third junction 6, 8 of the plurality of reconnectable output leads 1-12 of the alternator 101.

The controller 31 categorizes the RMS output voltages that are obtained from the second, third and fourth sensors 22, 23, 24 within a range of voltages to determine if the alternator 101 is producing three phase wye, three phase delta or single phase power. It should be noted that the second, third and fourth sensors 22, 23, 24 may measure additional characteristics such as output current, real power, reactive power, total harmonic distortion, harmonic content of the output voltage and/or current, phase angles between voltages and/or phase rotation direction (among other characteristics).

In addition, the controller 31 may categorize the RMS output voltages that are obtained from the second, third and fourth sensors 22, 23, 24 within a range of voltages to determine if the plurality of reconnectable output leads 1-12 of the alternator 101 are configured such that the voltage generating coils within the alternator 101 are connected in high wye, low wye, delta or single phase.

Categorization of the RMS output voltages that are obtained from the second, third and fourth sensors 22, 23, 24 may also be related to the excitation level of the field that is measured by the first sensor 21. An example of this relationship when the alternator 101 is connected in a high wye, low wye or delta configuration is illustrated in FIG. 5. FIG. 5 shows this relationship when there is no current supplied by the alternator 101.

Figure 6:
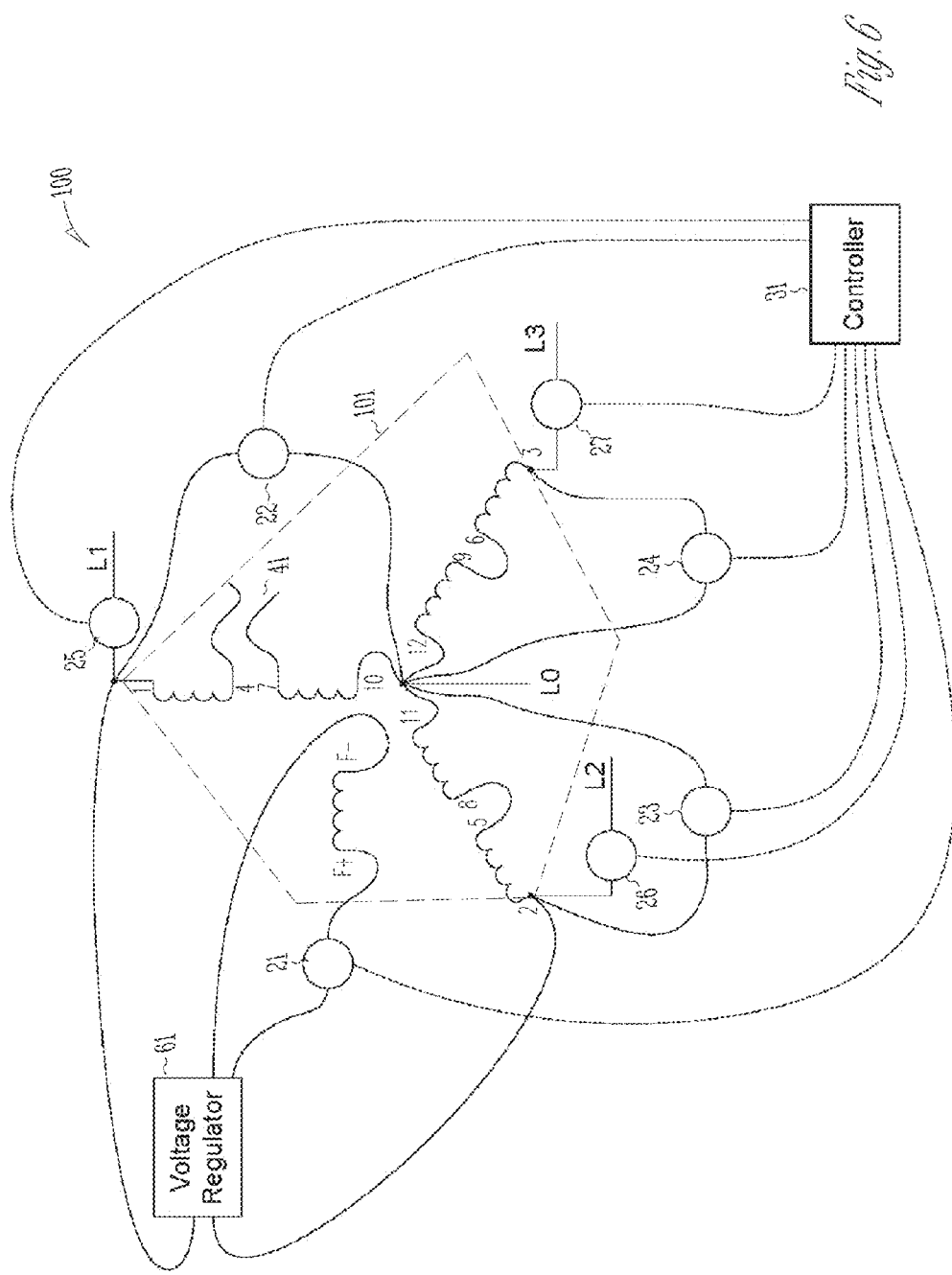
FIG. 6 is a schematic diagram of a controlled field alternator where the alternator is wired in a high wye configuration (coils wired in series) and where there is a missing connection between two leads.

In the example embodiment shown in FIG. 6, the system 100 further includes (i) a fifth sensor 25 that measures the RMS output current of the first 1 of the plurality of reconnectable output leads 1-12 of the alternator 101; (ii) a sixth sensor 26 that measures the RMS output current of the second 2 of the plurality of reconnectable output leads 1-12 of the alternator 101; and (iii) a seventh sensor 27 that measures the RMS output current of the third 3 of the plurality of reconnectable output leads 1-12 of the alternator 101.

The controller 31 may categorize the RMS output currents that are obtained from the fifth, sixth and seventh sensors 25, 26, 27 within a range of currents that are determined based on the categorization of voltage ranges that are obtained from the second, third and fourth sensors 22, 23, 24. Therefore, the controller 31 may be able to detect if the plurality of reconnectable output leads 1-12 of the alternator 101 are configured such that the alternator 101 output is short circuited or open-circuited. As shown in FIG. 6, an open-circuit (see, e.g., missing connection 41) results in loss of output voltage on phase 1 as measured by second sensor 22.

Figure 7:
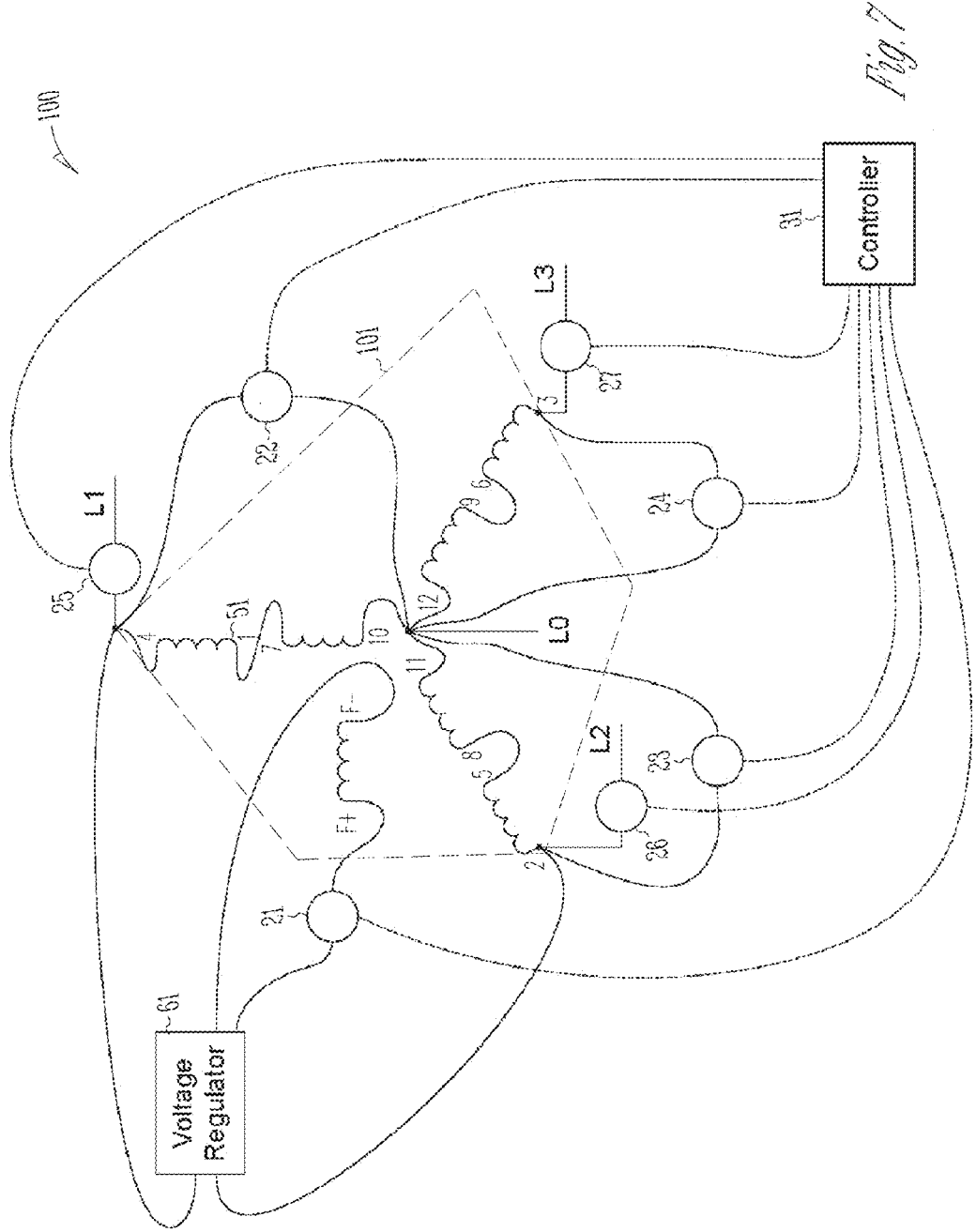
FIG. 7 is a schematic diagram of a controlled field alternator where the alternator is wired in a high wye configuration (coils wired in series) and where there is a coil incorrectly wired in reverse.

In the example embodiment shown in FIG. 7, the alternator 101 is incorrectly wired (i.e., coil 51 is wired in reverse). When coil 51 is wired in reverse, there is no output voltage measured by the second sensor 22. The incorrect wiring shown in FIG. 6 differs from the incorrect wiring shown in FIG. 7 in that the fifth sensor 25 is able to measure current with the incorrect wiring shown in FIG. 7 but will not measure current with the incorrect wiring shown in FIG. 6.

The controller 31 may be able to detect various different incorrect wiring configurations. In addition, the controller 31 may use output current sensed by the fifth, sixth and seventh sensors 25, 26, 27 to differentiate between various different incorrect wiring configurations.

FIG. 8 illustrates an example sensor measurement when there is a missing connection 41 (as shown in FIG. 6). FIG. 9 illustrates an example sensor measurement when there is a reverse connection 51 (as shown in FIG. 7).

One of the example applications of the system 100 involves adjusting a target voltage of the voltage regulator 61. This target voltage adjustment may be based on the detected wiring configuration of the alternator 101.

It should be noted that while in the illustrated example embodiments, the controller 31 and the voltage regular 61 are shown as being separate, embodiments are contemplated where the controller 31 and the voltage regular 61 are part of the same controller.

Figure 10:
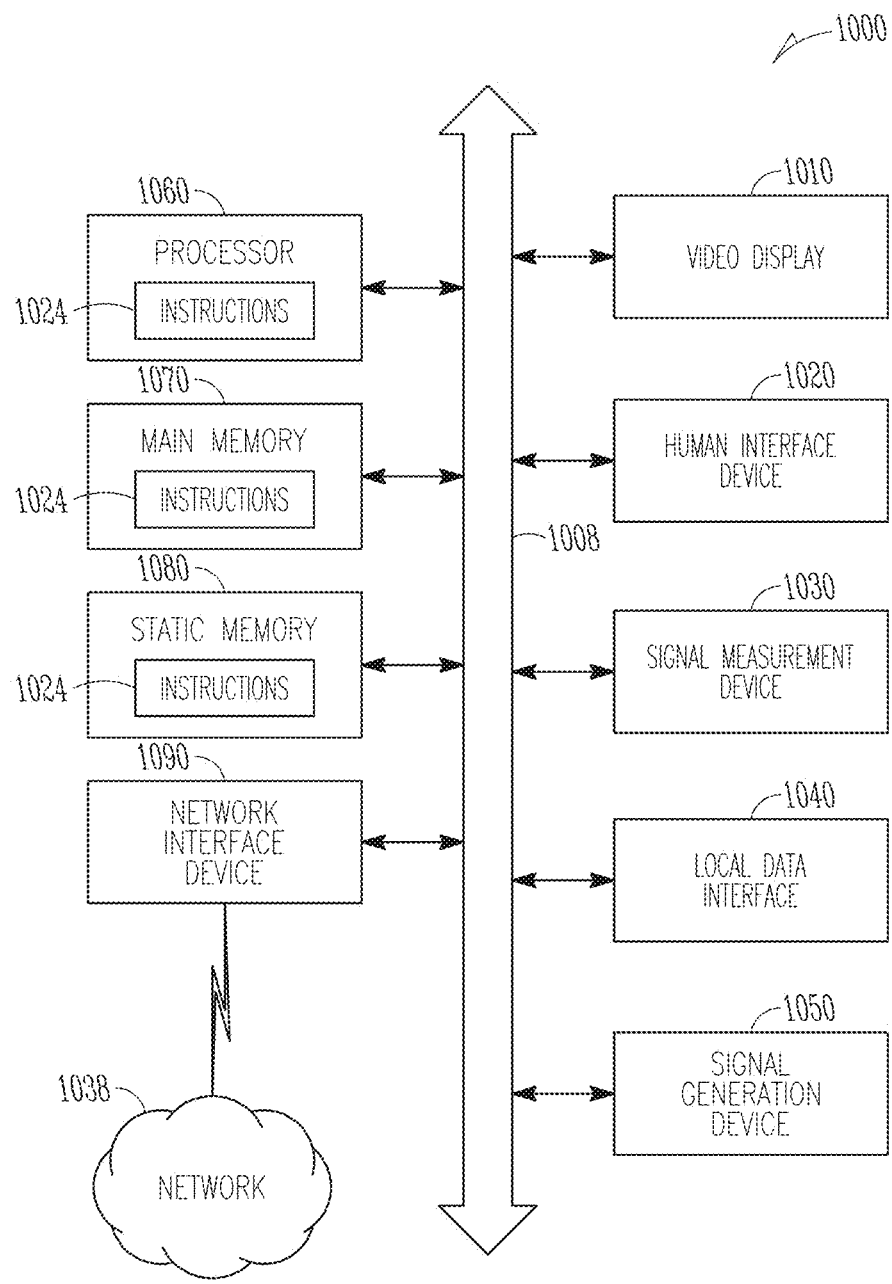
FIG. 10 is a block diagram that illustrates a diagrammatic representation of a machine in the example form of a computer system within which a set of instructions for causing the machine to perform any one or more of the methodologies discussed herein may be executed.

FIG. 10 is a block diagram that illustrates a diagrammatic representation of a machine in the example form of a computer system 1000 within which a set of instructions for causing the machine to perform any one or more of the methodologies discussed herein may be executed. In some embodiments, the computer system 1000 may operate in the capacity of a server or a client machine in a server-client network environment, or as a peer machine in a peer-to-peer (or distributed) network environment.

The computer system 1000 may be a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 may include a processor 1060 (e.g., a central processing unit (CPU), a graphics processing unit (GPU) or both), a main memory 1070 and a static memory 1080, all of which communicate with each other via a bus 1008. The computer system 1000 may further include a video display unit 1010 (e.g., liquid crystal displays (LCD) or cathode ray tube (CRT)). The computer system 1000 also may include a human interface device 1020 (e.g., a keyboard, a mouse, or local push buttons. The computer system 1000 also may include a signal measuring device 1030, a local data interface 1040 (e.g. USB) a signal generation device 1050 (e.g., a speaker), and a network interface device 1090.

The software 1024 may also reside, completely or at least partially, within the main memory 1070 and/or within the processor 1060 during execution thereof by the computer system 1000, the main memory 1070 and the processor 1060. It should be noted that the software 1024 may further be transmitted or received over a network via the network interface device 1090.

While the local data interface 1040 is shown to be a single connection, it may be part of a network that connects multiple devices. As an example the local data interface 1040 may be a USB hub.

Thus, a computerized method and system are described herein. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system for detecting a wiring configuration of a controlled field alternator that produces alternating current and includes a plurality of reconnectable output leads, the system comprising:
   a sensor for measuring an output voltage of the alternator; and
   a controller that includes a plurality of predetermined voltage ranges stored in a database, wherein one of the predetermined voltage ranges corresponds to high wye wiring configuration, another of the predetermined voltage ranges corresponds to low wye wiring configuration and another of the predetermined voltage ranges corresponds to delta wiring configuration, wherein the controller compares the output voltage of the alternator that is measured by the sensor with the plurality of predetermined voltage ranges to determine the wiring configuration of the alternator.

2. The system of claim 1, wherein the sensor measures the RMS output voltage of the alternator to determine the output characteristic of the alternator.

3. The system of claim 1, wherein the sensor measures the RMS output current of the alternator to determine the output characteristic of the alternator.

4. The system of claim 1, wherein the controller determines the plurality of predetermined voltage ranges using an excitation level that is measured by a sensor.

5. The system of claim 1, wherein the controller uses both the excitation level that is obtained from the first sensor and the output characteristic that is obtained from the second sensor to determine whether the plurality of reconnectable output leads are in an appropriate wiring configuration.

6. A system for detecting a wiring configuration of a controlled field alternator that produces alternating current and includes a plurality of reconnectable output leads, the system comprising:
   a first sensor for measuring an excitation level of a field within the alternator;
   a second sensor for measuring an output characteristic of the alternator; and
   a controller that controller includes a plurality of predetermined voltage ranges, wherein the controller compares the output characteristic of the alternator that is measured by the second sensor with the plurality of predetermined voltage ranges to determine the wiring configuration of the alternator, wherein the second sensor measures the RMS output voltage of a first one of the plurality of reconnectable output leads of the alternator, and the system further comprises:
   a third sensor that measures the RMS output voltage of a second one of the plurality of reconnectable output leads of the alternator;
   a fourth sensor that measures the RMS output voltage of a third one of the plurality of reconnectable output leads of the alternator; and
   wherein the controller categorizes the RMS output voltages that are obtained from the second, third and fourth sensors within a range of voltages to determine if the alternator is producing three phase or single phase power.

7. A system for detecting a wiring configuration of a controlled field alternator that produces alternating current and includes a plurality of reconnectable output leads, the system comprising:
   a first sensor for measuring an excitation level of a field within the alternator;
   a second sensor for measuring an output characteristic of the alternator; and
   a controller that includes a plurality of predetermined voltage ranges, wherein the controller compares the output characteristic of the alternator that is measured by the second sensor with the plurality of predetermined voltage ranges to determine the wiring configuration of the alternator, wherein the second sensor measures the RMS output voltage of a first one of the plurality of reconnectable output leads of the alternator, and the system further comprises:
   a third sensor that measures the RMS output voltage of a second one of the plurality of reconnectable output leads of the alternator;
   a fourth sensor that measures the RMS output voltage of a third one of the plurality of reconnectable output leads of the alternator; and
   wherein the controller categorizes the RMS output voltages that are obtained from the second, third and fourth sensors within a range of voltages to determine if the plurality of reconnectable output leads of the alternator are configured such that the voltage generating coils within the alternator are connected in series or parallel.

8. The system of claim 7, further comprising:
a fifth sensor that measures the RMS output current of a first one of the plurality of reconnectable output leads of the alternator;
a sixth sensor that measures the RMS output current of a second one of the plurality of reconnectable output leads of the alternator; and
a seventh sensor that measures the RMS output current of a third one of the plurality of reconnectable output leads of the alternator; and
wherein the controller categorizes the RMS output currents that are obtained from the fifth, sixth and seventh sensors within a range of currents determined by based on the categorization of voltage ranges that are obtained from the second, third and fourth sensors such that the controller detects if the plurality of reconnectable output leads of the alternator are configured such that the alternator output is short circuited.

9. A method of detecting a wiring configuration for a controlled field alternator that produces alternating current, the method comprising:
using a controller to supply a target voltage to a voltage regulator that controls an output voltage of the alternator;
detecting an excitation level of a field within the alternator;
determining an output characteristic of the alternator;
using the controller to determine the wiring configuration of the alternator having a plurality of reconnectable output leads based on at least one of the excitation level and output characteristic, wherein the controller includes a plurality of predetermined voltage ranges stored in a database, wherein one of the predetermined voltage ranges corresponds to high wye wiring configuration, another of the predetermined voltage ranges corresponds to low wye wiring configuration and another of the predetermined voltage ranges corresponds to delta wiring configuration;
using the controller to compare an output voltage of the alternator with the plurality of predetermined voltage ranges to determine the wiring configuration of the alternator; and
using the controller to adjust the target voltage supplied to the voltage regulator based on the determined wiring configuration.

10. The method of claim 9, wherein detecting an excitation level of a field within the alternator includes measuring the direct current flowing through the field within the alternator.

11. The method of claim 9, wherein determining an output characteristic of the alternator includes measuring the RMS output voltage of the alternator.

12. The method of claim 9, wherein determining an output characteristic of the alternator includes measuring the RMS output current of the alternator.

13. The method of claim 9, wherein using at least one of the excitation level and output characteristic to determine the wiring configuration of the alternator includes detecting whether the plurality of reconnectable output leads are in an appropriate wiring configuration.

14. A method of detecting a wiring configuration for a controlled field alternator that produces alternating current, the method comprising:
detecting an excitation level of a field within the alternator;
determining an output characteristic of the alternator;
using at least one of the excitation level and output characteristic to determine the wiring configuration of the alternator having a plurality of reconnectable output leads;
using a controller to supply a target voltage to a voltage regulator that controls an output voltage of the alternator; and
using the controller to adjust the target voltage supplied to the voltage regulator based on the determined wiring configuration, wherein using at least one of the excitation level and output characteristic to determine the wiring configuration of the alternator includes measuring the saturation RMS output voltage of the alternator and categorizing the saturation RMS output voltage within a predetermined range of voltages.

15. The method of claim 14, wherein using at least one of the excitation level and output characteristic to determine the wiring configuration of the alternator includes measuring the direct current voltage applied across the field within the alternator when the alternator output is regulated by a voltage regulator.

16. A method of detecting a wiring configuration for a controlled field alternator that produces alternating current, the method comprising:
detecting an excitation level of a field within the alternator;
determining an output characteristic of the alternator;
using at least one of the excitation level and output characteristic to determine the wiring configuration of the alternator having a plurality of reconnectable output leads;
using a controller to supply a target voltage to a voltage regulator that controls an output voltage of the alternator; and
using the controller to adjust the target voltage supplied to the voltage regulator based on the determined wiring configuration, wherein using at least one of the excitation level and output characteristic to determine the wiring configuration of the alternator includes measuring the direct current flowing through the field within the alternator while measuring the RMS output voltage of the alternator and categorizing the RMS output voltage within a range of voltages that is determined based on the direct current flowing through the field.

17. The method of claim 16, wherein measuring the RMS output voltage of the alternator and categorizing the RMS output voltage within a range of voltages that is determined based on the direct current flowing through the field includes measuring a plurality of RMS output voltages to determine if the alternator is producing three phase or single phase power.

18. The method of claim 17, wherein measuring a plurality of RMS output voltages to determine if the alternator is producing three phase or single phase power includes determining whether voltage generating coils within the alternator are connected in series or parallel.

* * * * *